United States Patent
Izumida et al.

(10) Patent No.: US 8,273,465 B2
(45) Date of Patent: Sep. 25, 2012

(54) SLIDE MEMBER

(75) Inventors: Manabu Izumida, Inuyama (JP); Hideo Tsuji, Inuyama (JP)

(73) Assignee: Daido Metal Company Ltd., Nagoya-Shi (JP)

( * ) Notice: Subject to any disclaimer, the term of this patent is extended or adjusted under 35 U.S.C. 154(b) by 366 days.

(21) Appl. No.: 12/730,808

(22) Filed: Mar. 24, 2010

(65) Prior Publication Data

US 2010/0248999 A1    Sep. 30, 2010

(30) Foreign Application Priority Data

Mar. 24, 2009   (JP) ................................. 2009-071900

(51) Int. Cl.
*F16C 33/12*    (2006.01)
*C25D 3/46*    (2006.01)

(52) U.S. Cl. ......... 428/673; 428/642; 384/912; 205/263

(58) Field of Classification Search .................. None
See application file for complete search history.

(56) References Cited

U.S. PATENT DOCUMENTS

| | | | |
|---|---|---|---|
| 5,342,698 A | | 8/1994 | Fujisawa et al. |
| 5,520,492 A | * | 5/1996 | Ohmi et al. ................... 411/427 |
| 5,530,283 A | * | 6/1996 | Ohmi et al. ................... 257/677 |
| 7,173,188 B2 | * | 2/2007 | Endo et al. ................... 174/94 R |
| 2004/0202887 A1 | | 10/2004 | Kawachi et al. |
| 2004/0226818 A1 | * | 11/2004 | Takagi et al. ................ 204/298.13 |
| 2006/0169577 A1 | * | 8/2006 | Takagi et al. ................ 204/192.15 |
| 2007/0030568 A1 | * | 2/2007 | Ohmi et al. .................... 359/584 |
| 2007/0230845 A1 | | 10/2007 | Rumpf |

FOREIGN PATENT DOCUMENTS

| | | |
|---|---|---|
| DE | 42 19 144 A1 | 12/1992 |
| DE | 10 2004 015 827 A1 | 11/2004 |
| GB | 2 400 420 A | 10/2004 |
| JP | 11269580 | 10/1999 |
| JP | 2004-307960 | 11/2004 |
| JP | 2007-271084 A | 3/2006 |

OTHER PUBLICATIONS

Office Action of Mar. 16, 2011 issued in corresponding Appln No. 10 2010 012 409.5 by the German Patent Office.
United Kingdom Intellectual Property Office Combined Search and Examination Report dated Jul. 9, 2010 in corresponding Application No. GB 1004853.6.

* cited by examiner

*Primary Examiner* — John J Zimmerman
(74) *Attorney, Agent, or Firm* — Browdy and Neimark, PLLC

(57) ABSTRACT

A slide member including a base material; and an overlay that is formed over the base material and that consists of Ag or Ag alloy including crystal planes (hk1) represented by Miller indices; wherein a relative X-ray diffraction intensity of crystal plane (200) to a sum of X-ray diffraction intensities of crystal planes (200), (111), (220), (311), and (222) of the overlay ranges between $1\% \leq (200)/\{(200)+(111)+(220)+(311)+(222)\} \leq 20\%$ and the relative X-ray diffraction intensity of the crystal plane (200) to the X-ray diffraction intensity of the crystal plane (111) ranges between $1\% \leq (200)/(111) \leq 30\%$.

12 Claims, 10 Drawing Sheets

| SAMPLE NO. | OVERLAY | | | | | COATING LAYER | |
|---|---|---|---|---|---|---|---|
| | LAYER THICKNESS (μm) | RATIO OF X-RAY DIFFRACTION (%) | | | COUNT OF R2/R1 BEING 4 OR LESS | MATERIAL | LAYER THICKNESS (μm) |
| | | A | B | C | | | |
| EXEMPLARY EXPERIMENT 1 | 5 | 5.0 | 7.5 | 4.7 | 6 | – | – |
| EXEMPLARY EXPERIMENT 2 | 5 | 5.2 | 7.8 | 5.2 | 6 | – | – |
| EXEMPLARY EXPERIMENT 3 | 5 | 9.2 | 12.0 | 9.0 | 7 | – | – |
| EXEMPLARY EXPERIMENT 4 | 5 | 18.0 | 27.0 | 17.5 | 8 | – | – |
| EXEMPLARY EXPERIMENT 5 | 5 | 19.5 | 28.7 | 19.5 | 8 | – | – |
| EXEMPLARY EXPERIMENT 6 | 5 | 5.0 | 7.5 | 4.7 | 6 | Bi | 5 |
| EXEMPLARY EXPERIMENT 7 | 5 | 5.2 | 7.8 | 5.2 | 6 | Bi | 5 |
| EXEMPLARY EXPERIMENT 8 | 5 | 9.2 | 12.0 | 9.0 | 7 | Bi | 5 |
| EXEMPLARY EXPERIMENT 9 | 5 | 18.0 | 27.0 | 17.5 | 8 | Bi | 5 |
| EXEMPLARY EXPERIMENT 10 | 5 | 19.5 | 28.7 | 19.5 | 8 | Bi ALLOY | 5 |
| EXEMPLARY EXPERIMENT 11 | 5 | 18.0 | 27.0 | 17.5 | 8 | Sn | 5 |
| COMPARATIVE EXPERIMENT 1 | 5 | 0.6 | 0.9 | 0.6 | 6 | – | – |
| COMPARATIVE EXPERIMENT 2 | 5 | 23.2 | 32.0 | 23.2 | 1 | – | – |
| COMPARATIVE EXPERIMENT 3 | 5 | 30.1 | 42.1 | 30.0 | 4 | – | – |
| COMPARATIVE EXPERIMENT 4 | 5 | 0.6 | 0.9 | 0.6 | 6 | Bi | 5 |
| COMPARATIVE EXPERIMENT 5 | 5 | 23.2 | 32.0 | 23.2 | 1 | Bi | 5 |
| COMPARATIVE EXPERIMENT 6 | 5 | 30.1 | 42.1 | 30.0 | 4 | Bi | 5 |

| SAMPLE NO. | BEARING PERFORMANCE | | |
|---|---|---|---|
| | SHIM TEST (min) | | BONDING TEST (MPa) |
| | SHIM THICKNESS 10 μm | SHIM THICKNESS 30 μm | |
| EXEMPLARY EXPERIMENT 1 | 45 | – | – |
| EXEMPLARY EXPERIMENT 2 | 60 | – | – |
| EXEMPLARY EXPERIMENT 3 | 65 | – | – |
| EXEMPLARY EXPERIMENT 4 | 55 | – | – |
| EXEMPLARY EXPERIMENT 5 | 50 | – | – |
| EXEMPLARY EXPERIMENT 6 | – | 100 OR GREATER | 20 OR GREATER |
| EXEMPLARY EXPERIMENT 7 | – | 100 OR GREATER | 20 OR GREATER |
| EXEMPLARY EXPERIMENT 8 | – | 100 OR GREATER | 20 OR GREATER |
| EXEMPLARY EXPERIMENT 9 | – | 100 OR GREATER | 20 OR GREATER |
| EXEMPLARY EXPERIMENT 10 | – | 100 OR GREATER | 20 OR GREATER |
| EXEMPLARY EXPERIMENT 11 | – | 100 OR GREATER | 15 |
| COMPARATIVE EXPERIMENT 1 | 40 | – | – |
| COMPARATIVE EXPERIMENT 2 | 40 | – | – |
| COMPARATIVE EXPERIMENT 3 | 20 | – | – |
| COMPARATIVE EXPERIMENT 4 | – | 95 | – |
| COMPARATIVE EXPERIMENT 5 | – | 90 | – |
| COMPARATIVE EXPERIMENT 6 | – | 80 | – |

FIG. 7

| PLATING CONDITION | Ag PLATING STEP 1 |
|---|---|
| NEGATIVE CURRENT DENSITY (A/dm$^2$) | 0.5~4.0 |
| PLATING BATH TEMPERATURE (°C) | 15~40 |
| PLATING LIQUID COMPOSITION | |
| SILVER CONCENTRATION (g/L) | 20~40 |
| ACID CONCENTRATION (g/L) | 40~80 |
| MADE BY DAIWA FINE CHEMICALS CO., LTD. GPE-AD (mL/L) | 10~30 |

FIG. 8

| PLATING CONDITION | Ag PLATING STEP 2 |
|---|---|
| NEGATIVE CURRENT DENSITY (A/dm$^2$) | 5.7~5.0 |
| PLATING BATH TEMPERATURE (°C) | 30~40 |
| PLATING LIQUID COMPOSITION | |
| SILVER CONCENTRATION (g/L) | 30~40 |
| ACID CONCENTRATION (g/L) | 60~80 |
| MADE BY DAIWA FINE CHEMICALS CO., LTD. GPE-AD (mL/L) | 20~30 |

FIG. 9

| PLATING CONDITION | Ag PLATING STEP 3 |
|---|---|
| NEGATIVE CURRENT DENSITY (A/dm$^2$) | 0.5~5.0 |
| PLATING BATH TEMPERATURE (°C) | 15~40 |
| PLATING LIQUID COMPOSITION | |
| SILVER CYANIDE (g/L) | 30~60 |
| SODIUM CYANIDE (g/L) | 100~200 |
| SODIUM CARBONATE (g/L) | 10~30 |

FIG. 10

| PLATING CONDITION | Ag PLATING STEP 4 |
|---|---|
| NEGATIVE CURRENT DENSITY (A/dm$^2$) | 0.5~5.0 |
| PLATING BATH TEMPERATURE (°C) | 35~45 |
| PLATING LIQUID COMPOSITION | |
| SILVER DYN AGM-15 (g/L) | 70~200 |
| SILVER DYN AGI (g/L) | 330~500 |
| SILVER DYN AGH (g/L) | 25~50 |

FIG. 11

| PLATING CONDITION | Bi PLATING STEP |
|---|---|
| NEGATIVE CURRENT DENSITY (A/dm²) | 1.0~6.0 |
| PLATING BATH TEMPERATURE (°C) | 25~40 |
| PLATING LIQUID COMPOSITION | |
| BISMUTH OXIDE (g/L) | 10~70 |
| METHANSULFON ACID (mL/L) | 30~150 |
| MADE BY EBARA-UDYLITE CO., LTD. EBASOLDER #10R (mL/L) | 20~40 |
| FIRST TIN OXIDE (g/L) | 0~5 |

FIG. 12

| PLATING CONDITION | Sn PLATING STEP |
|---|---|
| NEGATIVE CURRENT DENSITY (A/dm²) | 2.5~10 |
| PLATING BATH TEMPERATURE (°C) | 25~35 |
| PLATING LIQUID COMPOSITION | |
| BORON FLUROIDE TIN (g/L) | 200 |
| BORON FLUROIDE HYDROACID (g/L) | 50 |
| ACIDIUM BORICUM (g/L) | 30 |
| GELATIN (g/L) | 15 |
| β-NAFTOL (g/L) | 1 |

| TEST CONDITION | | |
|---|---|---|
| ITEMS | CONDITIONS | UNIT |
| BEARING DIMENSION | φ55 × L15 × t15 | mm |
| LOAD | 30 | MPa |
| COUNT OF ROTATION | 7000 | rpm |
| SPEED OF ROTATION | 18.3 | m/s |
| TEST TIME | 100 | min |
| LUBRICANT | VG68 | - |
| ENTRANCE TEMPERATURE | 60 | °C |
| OIL SUPPLY PRESSURE | 0.4 | MPa |
| SHAFT MATERIAL | S55C | - |
| SHAFT ROUGHNESS | 1 | Rmax μm |

FIG. 13

SLIDE MEMBER

CROSS-REFERENCE TO RELATED APPLICATIONS

This application is based upon and claims the benefit of priority from the prior Japanese Patent Application No. 2009-071900, filed on, Mar. 24, 2009 the entire contents of which are incorporated herein by reference.

FIELD

The present invention relates to a slide member having a base material coated with an overlay consisting of Ag or Ag alloy.

BACKGROUND

A slide member such as a slide bearing typically used in internal combustion engines for automobiles and industrial machines in general require high levels of seizure resistance, fatigue resistance, wear resistance and conformability. Some of the examples of slide bearings used in combustion engine applications are: an Al-based bearing lined with Al alloy over its back metal layer, a Cu-based bearing lined with Cu alloy over its back metal layer, and bearings with overlay coated on the surface of these alloy layers. The above described slide bearings are employed depending on the requirements of their use and environment.

Examples of overlay as such described above, are disclosed in Japanese Patent Publications such as JP H11-269580 A, and JP 2004-307960 A. The overlay disclosed in JP H11-269580 A employs Ag as a primary ingredient for improving seizure resistance. JP H11-269580 A also discloses Ag-based overlay comprising at least one of Cu, In, Sb, Al, and Sn amounting to a mass of 5% or less. Overlay disclosed in JP 2004-307960 A contains easily sulfurated metal particles having particle diameter of 1 µm or less and solid lubricant hard particles having particle diameter of 0.5 µm or less for the purpose of improving seizure, fatigue, and wear resistances. JP 2004-307960 A also discloses an Ag-based overlay containing easily sulfurated, metal particles, solid lubricant hard particles, and hard particles of carbides.

Recent internal combustion engines operate under high-speed and produce high-output in relatively less weight. However high-speed and high-output operation tends to thin the oil film to render the internal combustion engine seizure prone. On the other hand, reduced weight renders the bearing housing deformation prone, thus, rendering the slide bearing deformation prone and consequently fatigue prone. One solution to address such shortcomings is costing the base material with overlay consisting of Ag or Ag alloy having outstanding fatigue and wear resistances.

However, the downside of such overlay consisting of Ag or Ag alloy is hardness and inferior conformability relative to overlay comprising Sn, for example.

SUMMARY

In one aspect, the present invention provides a slide member that has its base material coated with an overlay consisting of Ag or Ag alloy to provide outstanding conformability.

Through repetitive experiments of verifying the behavior of Ag or Ag alloy overlay based on various Miller indices, the inventors have found that conformability of Ag-based overlay varies depending on the ratios between different miller indices surfaces. To elaborate, the inventors have found that superiority/inferiority of conformability of Ag-based overlay varies depending on the percentage that miller indices plane (200) occupies in the sum of miller indices planes (200), (111), (220), (311), and (222). Stated differently, inventors have found that Ag-based overlay is softened to provide favorable conformability when the relative X-ray diffraction intensity of (200) plane is within a given range in the sum of X-ray diffraction intensities of planes (200), (111), (220), (311), and (222). Inventors have also found that Ag-based overlay is softened to provide favorable conformability when X-ray diffraction intensity of (200) occupies a given percentage of that of (111). Of note is that miller indices plane (200) or any other miller indices plane may also be represented as plane (200), etc., or more simply as (200) in the present disclosure.

The above findings have allowed the inventors to conceive a slide member which employs a base material coated with an overlay that provides outstanding conformability.

In one aspect of the present invention, there is provided a slide member including a base material; and an overlay that is formed over the base material and that consists of Ag or Ag alloy including crystal planes (hkl) represented by Miller indices; wherein a relative X-ray diffraction intensity of crystal plane (200) to a sum of X-ray diffraction intensities of crystal planes (200), (111), (220), (311), and (222) of the overlay ranges between $1\% \leq (200)/\{(200)+(111)+(220)+(311)+(222)\} \leq 20\%$ and the relative X-ray diffraction intensity of the crystal plane (200) to the X-ray diffraction intensity of the crystal plane (111) ranges between $1\% \leq (200)/(111) \leq 30\%$.

FIG. 1 exemplifies the basic cross sectional feature of the slide member according to one aspect of the present invention. Slide member 1 shown in FIG. 1 is configured, for instance, by coating base material 2 with overlay 3. In the present disclosure, base material 2 is an element which is coated with overlay 3 and encompasses different set(s) of layers depending on the structure of slide member 1. For instance, in a slide member in which the element corresponding to a back metal layer supports its mating counterpart element without intervention of any other additional layers such as an Al-based bearing alloy layer and Cu-based bearing alloy layer, base material 2 refers to the element corresponding to the back metal layer. If any additional layers are provided over the back metal layer such as the alloy layers described above, base material 2 refers to such additional layer(s), or the additional layer(s) and the back metal layer taken together. Referring again to FIG. 1, base material 2 comprises steel back metal layer 21 and Cu-based bearing alloy layer 22 formed over steel back metal layer 21. Overlay 3 consists of Ag or Ag alloy. Examples of Ag alloy are, but not limited, to Ag—Sn, Ag—In, Ag—Zn, and Ag—C. Overlay 3 may further contain unavoidable impurities.

Overlay 3 according to one aspect of the present invention is configured such that the relative X-ray diffraction intensity of the crystal plane (200) to the sum of the X-ray diffraction intensities of the crystal planes (200), (111), (220), (311), and (222) ranges between $1\% \leq (200)/\{(200)+(111)+(220)+(311)+(222)\} \leq 20\%$ and the relative X-ray diffraction intensity of the crystal plane (200) to the X-ray diffraction intensity of the crystal plane (111) is within the range of $1\% \leq (200)/(111) \leq 30\%$. It has been verified by the inventors that overlay 3 meeting the above described conditions exhibits favorable conformability.

This means that, overlay 3 showed outstanding conformability when the percentage, stated differently, the relative X-ray diffraction intensity of (200) plane within the sum of the X-ray diffraction intensities of (220), (111), (200), (311), and (222) planes is 0.2 (20%) or less, and the relative X-ray diffraction intensity of (200) plane to the X-ray diffraction intensity of (111) plane is 0.3 (30%) or less. Overlay 3 also showed outstanding conformability when the relative X-ray diffraction intensity of (200) plane to the sum of the X-ray diffraction intensities of (220), (111) (200), (311), and (222) planes is 0.01 (1%) or greater and the relative X-ray diffraction intensity of (200) to the X-ray diffraction intensity of (111) is 0.01 (1%) or greater.

Slide member with exceptionally outstanding conformability was obtained when the relative X-ray diffraction intensity of (200) plane to the sum of the X-ray diffraction intensities of (220), (111), (200), (311), and (222) planes is 0.15 (15%) or less, and the relative X-ray diffraction intensity of (200) plane to the X-ray diffraction intensity of (111) plane is 0.2 (20%) or less. Overlay 3 also showed exceptionally outstanding conformability when the relative X-ray diffraction intensity of (200) plane to the sum of the X-ray diffraction intensities of (220), (111), (200), (311), and (222) planes is 0.07 (7%) or greater and the relative X-ray diffraction intensity of (200) to the X-ray diffraction intensity of (111) is 0.1 (10%) or greater.

FIG. 2 is a cross section of overlay 3 shown in FIG. 1 viewed in a microscope such as a transmission electron microscope, scanning electron microscope, and ion microscope. As can be seen in FIG. 2, the shape of the crystal grain of Ag according to the present disclosure is substantially granular or cubic and very rarely columnar.

According to another aspect of the present invention, among ten crystal grains having relatively large circumscribing circles that contact the outer periphery of the crystal grains constituting the overlay within a predetermined area of observation, five or more crystal grains are each configured such that smallest circumscribing circle thereof is four times or less in diameter than largest inscribing circle thereof that contacts an inner periphery of the crystal grain.

The predetermined area of observation in this context indicates an area of observation that would contain 10 or more crystal grains. For instance, a microscopic picture of 25 μm² substantially centering on a vertical thicknesswise center of the overlay would encompass the above described view of observation.

Referring to FIG. 3, a description will be given on the relation between the diameter of the smallest circumscribing circle contacting the outer periphery of the crystal grain and the diameter of the largest inscribing circle contacting the inner periphery of the crystal grain. FIG. 3 exemplifies an Ag crystal grain residing in overlay 3. In the present disclosure, the diameter of the largest inscribing circle contacting the inner periphery of the crystal grain is defined as R1 whereas the diameter of the smallest circumscribing circle contacting the outer periphery of the crystal grain is defined as R2. The following correlation was observed between diameters R1 and R2 and the shape of the crystal grains. The crystal shape becomes granular as the difference between diameters R1 and R2 become smaller. The crystal grain becomes increasingly granular when diameter R2 is four times or less than diameter R1. A columnar crystal grain, as opposed to a granular crystal grain in the present disclosure, denotes a crystal that has grown substantially upright from the surface side of base material 2 and that has diameter R2 greater than four times of diameter R1.

When load is applied on overlay 3 including relatively less percentage of columnar crystals, stated differently, on overlay 3 including relatively greater percentage of granular crystal grains having diameter R2 equal to or less than four times of diameter R1, the granular crystals are susceptible to downward and left and right movement by the applied load because of its granular shape. Thus, overlay 3 according to the present disclosure is deformation prone to the applied load, and thus, exhibits favorable conformability. Overlay 3 excels conformability when five or more granular crystals exist that have diameter R2 which is four times or less than diameter R1 among the ten crystal grains having relatively large circumscribing circles within the predetermined area of observation.

It is preferable to have seven or more granular crystals that have diameter R2 that is equal to or less than four times of R1. It is also preferable to have five or more granular crystals that have diameter R2 that is equal to or less than double of R1.

The percentage of vertically elongate columnar crystals residing within overlay 3 increase as the percentage of columnar crystals within overlay 3 increase. Thus, when load is applied on the upper surface of such overlay 3, the load is received at the upper end of the increasing amount of columnar crystals. Hence, vertical load applied on the upper surfaces of the columnar crystals exert a force to vertically shrink the columnar crystals. However, columnar crystals, possessing vertical structural rigidity, are not deformation prone.

According to yet another aspect of the present invention, the relative X-ray diffraction intensity of the crystal plane (200) to the sum of the X-ray diffraction intensities of all the crystal planes is equal to or greater than 5% and equal to or less than 15%.

The relative X-ray diffraction intensity of (200) plane, in this case, denotes the ratio or the percentage the X-ray diffraction intensity of (200) plane occupies in the sum of the X-ray diffraction intensities of all the miller indices planes. To elaborate, the relative X-ray diffraction intensity of each miller indices plane within Ag or Ag alloy of overlay 3 can be obtained by $R_{(hk1)} \div \Sigma R\ R_{(hk1)}$. The numerator $R_{(hk1)}$ represents the X-ray diffraction intensity of the plane for which the relative X-ray diffraction intensity is sought, and the dividend $\Sigma R\ R_{(hk1)}$ represents, in this case, the sum of all the X-ray diffraction intensity of all the miller indices planes. The relative X-ray diffraction intensity obtained by the above given equation may be represented in percentage notation.

Favorable conformability can be obtained when the relative X-ray diffraction intensity of the (200) plane to the sum of the X-ray diffraction intensities of all the crystal planes is equal to or greater than 0.05 (5%) and equal to or less than 0.15 (15%).

The percentage of the X-ray diffraction intensity of (200) plane within overlay 3 varies, for instance, with the condition in which overlay 3 is plated. In one exemplary embodiment, the percentage of the X-ray diffraction intensity of (200) plane thin overlay 3 is reduced by using plating liquid substantially free of iodine and cyanogens.

One possible approach for further improving the conformability of overlay 3 is coating overlay 3 with a coating layer made of highly conformable material.

According to still yet another aspect of the present invention, the overlay is coated with a coating layer being softer than overlay.

FIG. 4 shows an example of slide member 1 having overlay 3 coated with coating layer 4. Coating layer 4 comprises materials that are softer than Ag such as Bi, Bi alloy, Sn, and Sn alloy, Thus, load applied on the upper surface of overlay 3 and the overlying coating layer 4 causes coating layer 4 to deform easily, thereby enhancing the conformability of slide member 1.

According to still yet another aspect of the present invention, the coating layer contains Bi or Bi alloy.

The coating layer made of Bi or Bi alloy provides outstanding bonding with overlay 3 made of Ag or Ag alloy, and thus, is highly preferable for use in slide bearings of internal combustion engines to provide outstanding conformability.

BRIEF DESCRIPTION OF THE DRAWINGS

The features and advantages of the present invention will become clear upon reviewing the following description of the exemplary embodiment of the present disclosure with reference to the accompanying drawings, in which.

FIG. 6, parted into FIGS. 6A and 6B but collectively referred to as FIG. 6, indicates the applied test conditions and the test results of the shim test and bonding test;

FIG. 7 indicates the plating conditions applied in a first Ag plating;

FIG. 8 indicates the plating conditions applied in a second Ag plating;

FIG. 9 indicates the plating conditions applied in a third Ag plating;

FIG. 10 indicates the plating conditions applied in a fourth Ag plating;

FIG. 11 indicates the plating conditions applied in Bi plating;

FIG. 12 indicates the plating conditions applied in Sn plating; and

FIG. 13 indicates the test conditions applied in the shim test.

DETAILED DESCRIPTION

A description will be given hereinafter on one exemplary embodiment of the present invention.

Figure 1:
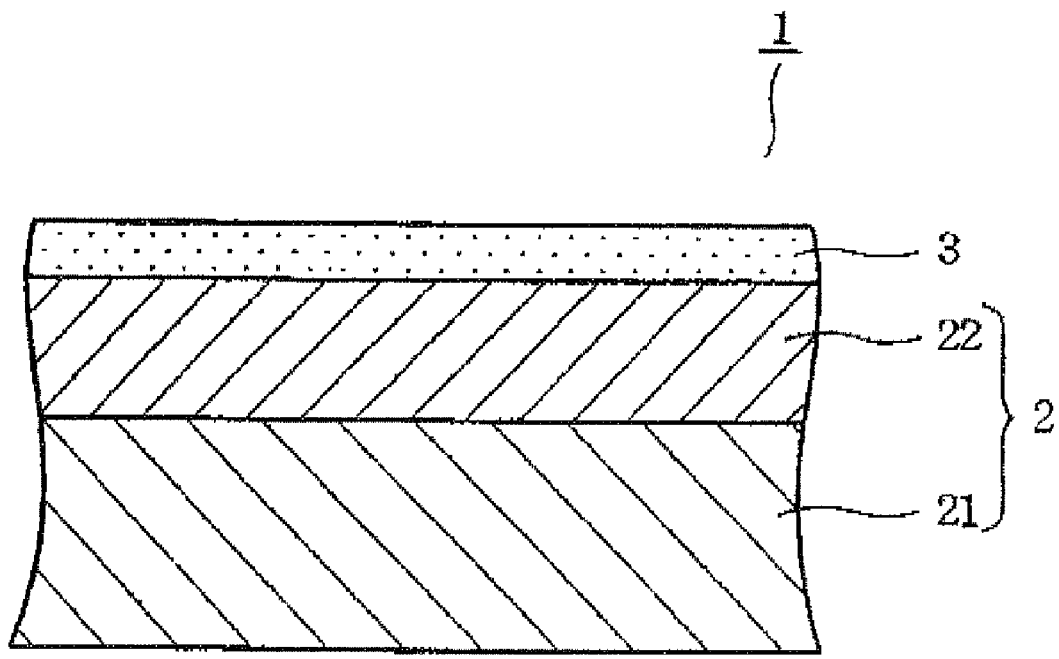
FIG. 1 is a cross sectional view of a slide member according to one aspect of the present invention.
Figure 2:
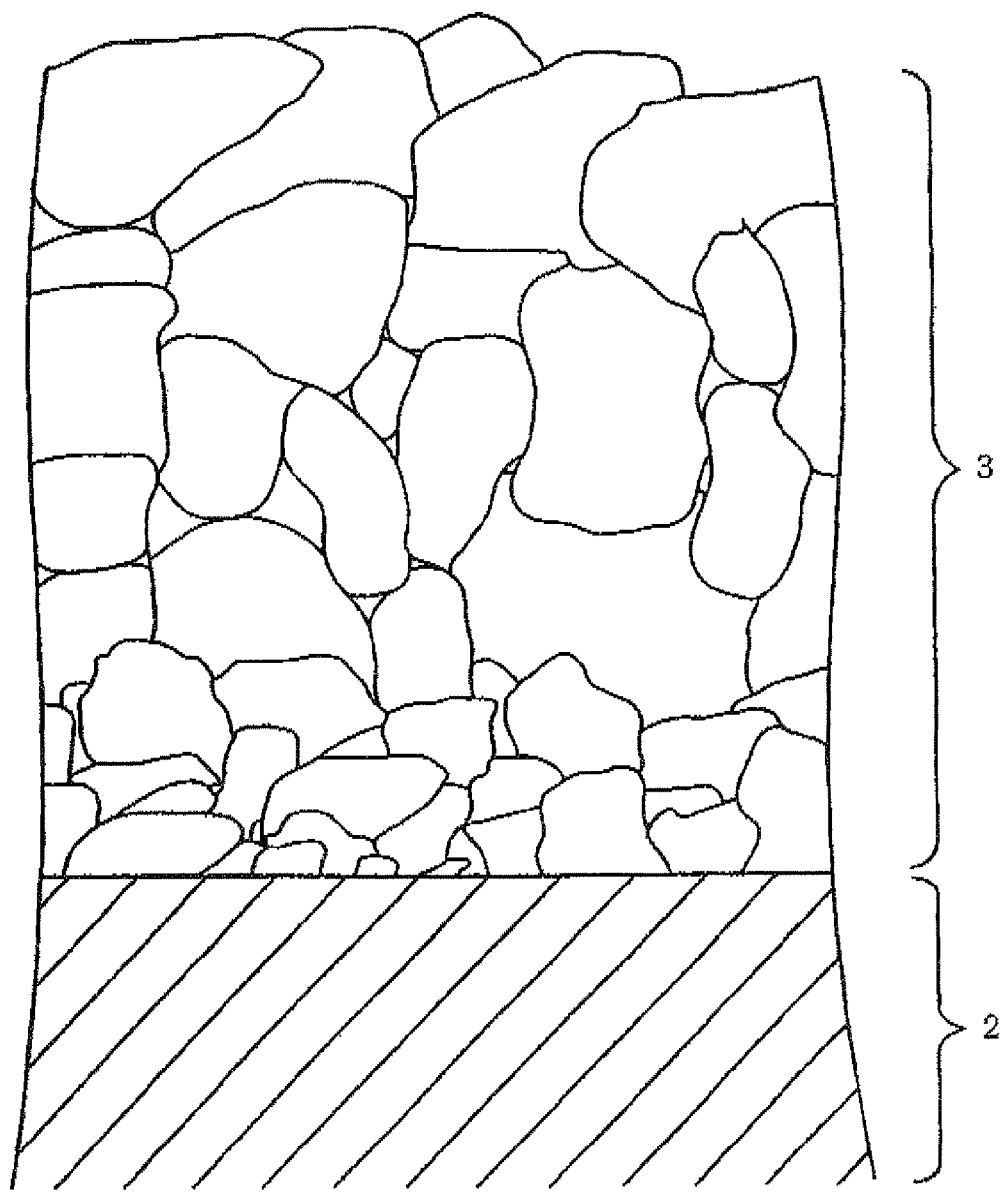
FIG. 2 is an enlarged view of an overlay shown in FIG. 1.
Figure 3:
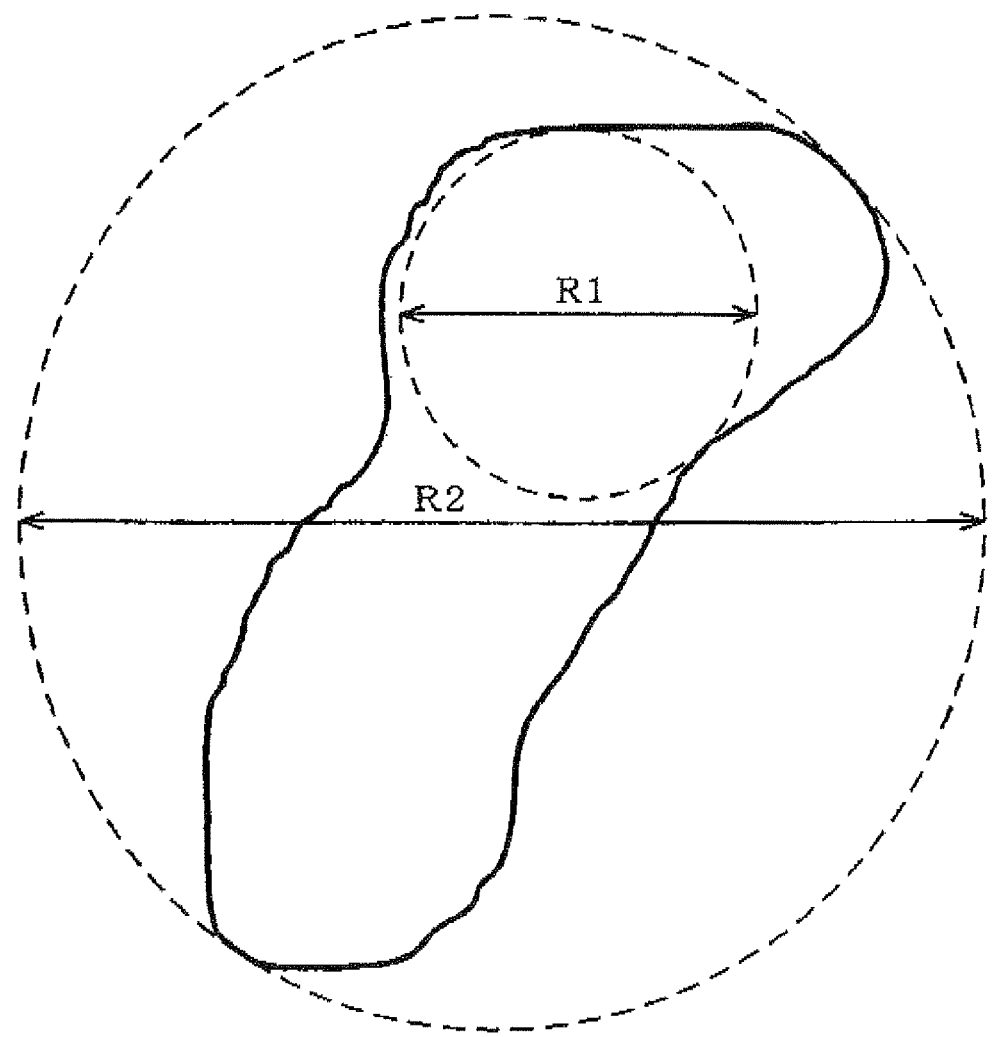
FIG. 3 schematically illustrates crystal grains within the overlay.
Figure 4:
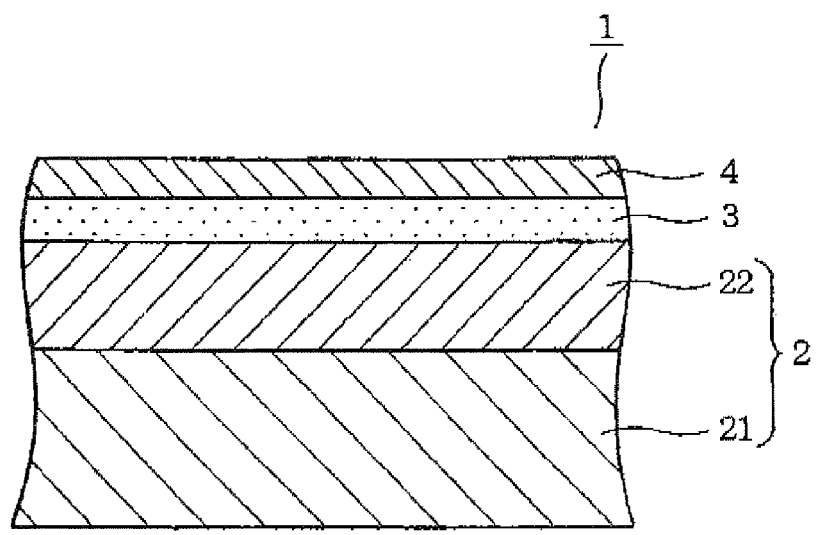
FIG. 4 is a cross sectional view of the overlay of the slide member being coated with a coating layer.

Referring to FIG. 1, slide member 1 according to one exemplary embodiment of the present invention comprises laminated layers of back metal layer 21 made of steel, Cu-based bearing alloy layer 22 formed over back metal layer 21, and overlay 3 made of Ag formed over Cu-based bearing alloy layer 22. As shown in FIG. 4, Bi-based coating layer 4 or Sn-based coating layer 4 may further be formed over overlay 3. In order to verify the effectiveness of overlay 3 according to the present invention, samples were tested for conformability and bonding through exemplary experiments 1 to 11 and comparative experiments 1 to 6.

The samples were made by lining steel back metal with Cu-based bearing alloy layer to form a bimetal which was molded into a semi-cylindrical or cylindrical shape. The bimetal in the present exemplary embodiment is molded into semi-cylindrical shape. Then, the surface of the bimetal was treated by boring the surface of the bearing alloy layer. Then, the surface of the semi-cylindrical mold was electrolytically degreased and pickled.

Thereafter, in exemplary experiments 1 to 11, Ag plating step 1 indicated in FIG. 7 was performed to obtain an overlay 3 with Ag being the only metal component.

In exemplary experiments 6 to 10, Bi plating step indicated in FIG. 11 was further performed after the Ag plating step 1 to form coating layer 4 with Bi being the only metal component over overlay 3 in exemplary experiments 6 to 9, whereas in exemplary experiment 10, coating layer 4 made of Bi alloy containing 2 mass % of Sn was formed over overlay 3.

In exemplary experiment 11, Sn plating step indicated in FIG. 12 was further performed after the Ag plating step 1 to form a coating layer 4 with Sn being the only metal component over overlay 3.

In comparative experiments 1 and 4, after electrolytically degreasing and pickling the semi-cylindrical mold, Ag plating step 2 indicated in FIG. 8 was performed to form overlay 3 with Ag being the only metal component. In comparative experiment 4, Bi plating step indicated in FIG. 11 was further performed after Ag plating step 2 to form coating layer 4 with Bi being the only metal component over overlay 3.

In comparative experiments 2 and 5, after electrolytically degreasing and pickling the semi-cylindrical mold, Ag plating step 3 indicated in FIG. 9 was performed to form overlay 3 with Ag being the only metal component. In comparative experiment 5, Bi plating step indicated in FIG. 11 was further performed after Ag plating step 3 to form coating layer 4 with Bi being the only metal component over overlay 3.

In comparative experiments 3 and 6, after electrolytically degreasing and pickling the semi-cylindrical mold, Ag plating step 4 indicated in FIG. 10 was performed to form overlay with Ag being the only metal component. In comparative experiment 6, Bi plating step indicated in FIG. 11 was further performed after Ag plating step 4 to form coating layer 4 with Bi being the only metal component over overlay 3.

Samples of overlay 3 obtained by the above described exemplary experiments 1 to 11 and comparative experiments 1 to 6 were subject to X-ray diffraction to obtain the X-ray diffraction intensities of each of the miller indices planes. Referring to FIG. 6, "A" under "RATIO OF X-RAY DIFFRACTION INTENSITY" provides the percentage indication of the value given by $(200)/\{(200)+(111)+(220)+(311)+(222)\}$, whereas "B" provides the percentage indication of the value given by $(200)/(111)$. Still referring to FIG. 6, "C" is a percentage indication of X-ray diffraction intensity of miller in dices plane (200) within the sum of the X-ray diffraction intensities of all the miller indices planes.

The samples of overlay 3 obtained through the experiments can be viewed with microscopes such as transparent electronic microscope, scan electronic microscope, FIB-SIM (Focused Ion Beam system-Scanning Ion Microscope), or through EBSP (Electron Back Scatter diffraction Pattern). In the present exemplary embodiment, the sizes of crystal grains were measured by 5 μm×5 μm microscopic photograph taken at the proximity of circumferential mid portion and thickness-wise mid portion of overlay. Referring again to FIG. 6, "LAYER THICKNESS" was measured based on the cross sectional image of the obtained samples taken by one of the above mentioned microscopes.

(1) Conformability Test

Figure 5:
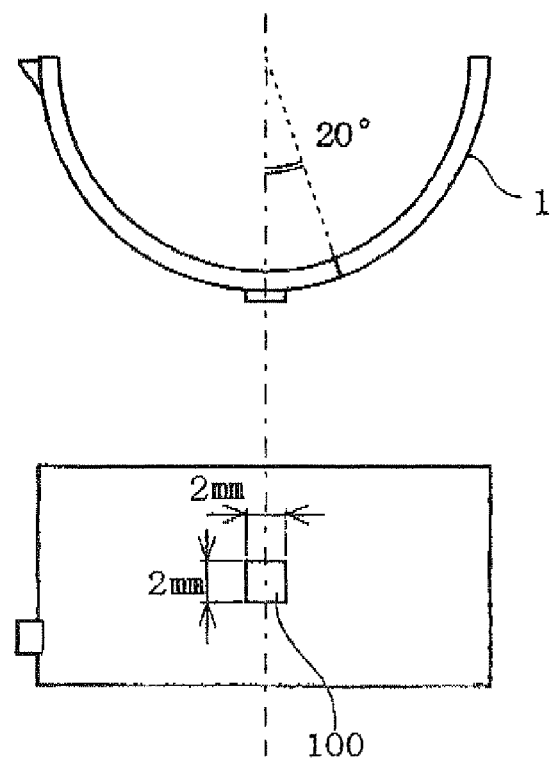
FIG. 5 illustrates a sample piece used in conformability test or shim test.

The samples obtained by the foregoing exemplary experiments 1 to 11 and comparative experiments 1 to 6 were evaluated for their conformability through shim testing. The test conditions are indicated in FIG. 13 and the shapes of the samples are indicated in FIG. 5. The shim test samples were made by mounting a metal plate or shim 100, dimensioned to 2 mm² multiplied by predetermined thickness of 10 μm and 30 μm, at the mid portion of the outer peripheral surface of each base sample. Each of the shim test samples were mounted on a placement of a rotary load tester. When the shim test sample is mounted on the placement of the rotary load tester, the inner peripheral side of the portion corresponding to where shim 100 is mounted protrudes radially inward. The amount of protrusion is proportionate to the shim 100 thickness. Then the test shaft of the rotary load tester was rotated under the conditions indicated in FIG. 13, and the temperature of the outer peripheral surface of the shim test sample located at a 20-degree circumferential displacement from the shim 100 center was measured. The load and the rotational speed in the shim test were escalated to a threshold of 30 MPa and 7000 rpm respectively, and the lapse of time from the moment the threshold was reached to the moment the variation of the temperature at the outer peripheral side of the shim test sample exceeded 2 degrees Celsius/second was measured. Of note is that the time when the threshold was reached denotes the test start time and the time when the temperature variation exceeded 2 degrees Celsius/second denotes the test end time.

Under the shim test, because the inner peripheral side of the portion where shim 100 is mounted protrudes radially inward, the protruded portion becomes susceptible to coming in contact with the test shaft. A well conformable shim test sample would deform itself so that its mating surface conforms with the surface of the test shaft. The deformation facilitates spreading of the oil supplied onto the surface of the shim test sample and thus, suppresses friction heat occurring from the physical contact between the shim test sample and the test shaft, which in turn discourages the temperature elevation at the outer peripheral surface of the shim test samples.

(2) Bonding Test

Bonding test was carried out with samples quite similar to those obtained in exemplary experiments 6 to 11 and comparative experiments 4 to 6 except that they were prepared in 20 mm×50 mm pieces. The sample pieces were bonded by epoxy resin based adhesives to a cylindrical iron bar, having a diameter ranging from 8 to 10 mm, at its surface coated with coating layer and were thereafter left to harden. After hardening, the overflow of adhesives at the bonding interface was removed and the sample pieces were subject to pull tension test at the rate of 5 mm/min. The measured tensile strength when coating layer 4 and overlay 3 of the sample pieces where detached from the other was divided by the cross sectional area of the iron bar to evaluate the bonding of coating layer 4 and overlay 3.

As can be seen from FIG. 6, exemplary experiments 1 to 11 excel in conformability and bonding strength as compared to comparative experiments 1 to 6.

First, a description will be give n on the results of the conformability test or the shim test.

As obvious from the outcome of "A" of "RATIO OF X-RAY DIFFRACTION INTENSITY" ranging from 5.0 to 19.5% which falls within the preferable range of 1 to 20% and "B" ranging from 7.5 to 28.7% which falls within the preferable range of 1 to 30%, it can be appreciated that the percentage that (200) plane occupies within overlay 3 is appropriate in exemplary experiments 1 to 11. Overlay 3 in exemplary experiments 1 to 11, thus, exhibited outstanding conformability. Upon further examination on overlay 3 without coating layer 4, exemplary experiments 2 to 5 contained five or more granular crystal grains having diameter R2 equal to or less than double of R1. Exemplary experiments 6 to 11 having coating layer 4 softer than overlay 3 being coated over overlay 3 exhibited outstanding conformability.

In contrast, comparative experiments 2, 3, 5, and 6 contained relatively greater percentage of (200) planes within overlay 3 as can be seen from the relatively greater "A" "B" "C" outcomes under "RATIO OF X-RAY DIFFRACTION INTENSITY", which is an indication that comparative experiments 2, 3, 5, and 6 are relatively poor in conformability.

It can be concluded from the comparison of exemplary experiment 1 with comparative experiment 1 or exemplary experiment 6 with comparative experiment 4 that favorable conformability can be obtained when (200) plane occupies 1% or more of overlay 3.

Next a description will be given on the result of bonding test.

Comparison of exemplary experiments 6 to 10 with exemplary experiment 11 shows that Bi-based coating layer 4 has greater bonding strength than Sn-based coating layer 4.

The present invention is not limited to the foregoing exemplary embodiment but may be modified or expanded as follows.

The foregoing embodiment only shows the test results of overlay 3 with Ag being the only metal component. However, similar results were obtained, for instance, from overlay 3 comprising Ag alloy containing Sn.

The present invention is not limited to application in slide bearings for automobile engines but may be applied to slide members in general.

The foregoing description and drawings are merely illustrative of the principles of the present invention and are not to be construed in a limited sense. Various changes and modifications will become apparent to those of ordinary skill in the art. All such changes and modifications are seen to fall within the scope of the invention as defined by the appended claims.

What is claimed is:

1. A slide member comprising:
   a base material; and
   an overlay that is formed over the base material and that consists of Ag or Ag alloy including crystal planes (hk1) represented by Miller indices;
   wherein a relative X-ray diffraction intensity of crystal plane (200) to a sum of X-ray diffraction intensities of crystal planes (200), (111), (220) (311), and (222) of the overlay ranges between $1\% \leq (200)/\{(200)+(111)+(220)+(311)+(222)\} \leq 20\%$ and the relative X-ray diffraction intensity of the crystal plane (200) to the X-ray diffraction intensity of the crystal plane (111) ranges between $1\% \leq (200)/(111) \leq 30\%$.

2. The slide member according to claim 1, wherein among ten crystal grains having relatively large circumscribing circles that contact an outer periphery of the crystal grains constituting the overlay within a predetermined area of observation, five or more crystal grains are each configured such that smallest circumscribing circle thereof is four times or less in diameter than largest inscribing circle thereof that contacts an inner periphery of the crystal grain.

3. The slide member according to claim 1, wherein the relative X-ray diffraction intensity of the crystal plane (200) to the sum of the X-ray diffraction intensities of all the crystal planes is equal to or greater than 5% and equal to or less than 15%.

4. The slide member according to claim 2, wherein the relative X-ray diffraction intensity of the crystal plane (200) to the sum of the X-ray diffraction intensities of all the crystal planes is equal to or greater than 5% and equal to or less than 15%.

5. The slide member according to claim 1, wherein the overlay is coated with a coating layer that is softer than the overlay.

6. The slide member according to claim 2, wherein the overlay is coated with a coating layer that is softer than the overlay.

7. The slide member according to claim 3, wherein the overlay is coated with a coating layer that is softer than the overlay.

8. The slide member according to claim 4, wherein the overlay is coated with a coating layer that is softer than the overlay.

9. The slide member according to claim 5, wherein the coating layer contains Bi or Bi alloy.

10. The slide member according to claim 6, wherein the coating layer contains Bi or Bi alloy.

11. The slide member according to claim 7, wherein the coating layer contains Bi or Bi alloy.

12. The slide member according to claim 8, wherein the coating layer contains Bi or Bi alloy.

* * * * *